United States Patent [19]
Anzai et al.

[11] Patent Number: 5,146,535
[45] Date of Patent: Sep. 8, 1992

[54] LIGHT-TRANSMITTING FIBER

[75] Inventors: Hisao Anzai, Otake; Isao Sasaki, Saeki; Kozi Nishida, Toyama; Hideaki Makino, Otake; Masami Ohtani, Kuga; Katsuhiko Shimada, Otake, all of Japan

[73] Assignee: Mitsubishi Rayon Company Ltd., Tokyo, Japan

[21] Appl. No.: 685,208

[22] Filed: Apr. 15, 1991

Related U.S. Application Data

[62] Division of Ser. No. 398,976, Aug. 28, 1989, Pat. No. 5,023,302.

[30] Foreign Application Priority Data

Aug. 30, 1988 [JP] Japan .................. 63-215774

[51] Int. Cl.$^5$ .................................. G02B 6/16
[52] U.S. Cl. ..................... 385/143; 385/145; 525/329.1
[58] Field of Search ............... 350/141, 142, 143, 144, 350/145; 525/329, 378

[56] References Cited

U.S. PATENT DOCUMENTS

| | | |
|---|---|---|
| 2,146,209 | 2/1939 | Graves . |
| 3,284,425 | 11/1966 | Schröder et al. . |
| 4,246,374 | 1/1981 | Kopchik .................. 525/329 |
| 4,687,295 | 8/1987 | Koishi et al. ............. 385/143 |
| 4,693,553 | 9/1987 | Sasaki et al. ............. 385/143 |
| 4,758,067 | 7/1988 | Tatsukami et al. ........ 385/143 |
| 4,768,860 | 9/1988 | Tatsukami et al. ........ 385/143 |
| 4,804,259 | 2/1989 | Sasaki et al. ............. 385/145 |
| 4,816,524 | 3/1989 | Anzai et al. .............. 525/378 |
| 4,989,947 | 2/1991 | Sasaki et al. ............. 385/143 |

FOREIGN PATENT DOCUMENTS

| | | |
|---|---|---|
| 0155567 | 9/1985 | European Pat. Off. . |
| 0232795 | 8/1987 | European Pat. Off. . |
| 0234726 | 9/1987 | European Pat. Off. . |
| 0273092 | 7/1988 | European Pat. Off. . |

Primary Examiner—John D. Lee
Assistant Examiner—Phan T. Heartney
Attorney, Agent, or Firm—Oblon, Spivak, McClelland, Maier & Neustadt

[57] ABSTRACT

A light-transmitting plastic fiber comprising, as a core component, a methacrylimide group-containing polymer prepared by polymerizing methyl methacrylate in the absence of a chain transfer agent and then imidizing the methyl methacrylate polymer thus prepared, and another polymer as a sheath component.

7 Claims, No Drawings

LIGHT-TRANSMITTING FIBER

This is a division, of application Ser. No. 07/398,976, filed on Aug. 28, 1989 (U.S. Pat. No. 5,023,301).

BACKGROUND OF THE INVENTION

1. Field of the Invention

The present invention relates to a light transmitting fiber comprising a methacrylamide group-containing polymer as a core component.

2. Description of the Related Art

Recently, transparent resins have been used in large quantities for high-performance optical materials, decorative materials, automobile parts, electric appliances and the like. These transparent resins are often used at high temperatures, and currently there is a strong demand that transparent resins should have not only a high transparency but also a high heat resistance. Namely, transparent resins in which excellent optical characteristics can be maintained for a long time, even at a high temperature, are required.

An imide group-containing polymer is known as a transparent resin having a heat resistance, and as the process for preparing this imide group-containing polymer, there have been proposed, for example, (1) a process in which a polymer of acrylic acid, methacrylic acid or an ester thereof is heated and reacted with a primary amine, ammonia or a primary amine-generating compound (U.S. Pat. No. 2,146,209), (2) a process in which a polymer of methyl methacrylate is reacted with a primary amine in the presence of water (U.S. Pat. No. 3,284,425), and (3) a process in which an acrylic polymer is reacted with ammonia or a primary amine in an extruder (U.S. Pat. No. 4,246,374).

The imidized polymers obtained by these processes have improved heat resistance, but these polymers have problems in that the optical characteristics thereof, especially the resistance to coloration under heating, are poor.

SUMMARY OF THE INVENTION

Therefore, a primary object of the present invention is to eliminate the above-mentioned defects of the conventional techniques, and provide a light transmitting fiber comprising a methacrylimide group-containing polymer as a core component.

In accordance with the present invention, there is provided a light-transmitting fiber having a core-sheath structure comprising a methacrylamide group-containing polymer as the core component and a polymer having a refractive index smaller than that of the core component as the sheath component, wherein the core component is a methacrylimide group-containing polymer prepared by the above-mentioned process.

DESCRIPTION OF THE PREFERRED EMBODIMENTS

The methacrylimide group-containing polymer is a methacrylic polymer having imide units introduced in the side chains of the molecule, as shown by the following formula:

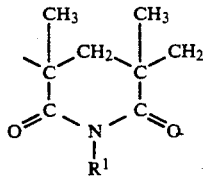

wherein R stands for H, an alkyl group having 1 to 12 carbon atoms, a cycloalkyl group having 7 to 11 carbon atoms or an aryl group having 6 to 10 carbon atoms.

The methacrylic polymer as the precursor of the methacrylimide group-containing polymer is prepared by polymerizing methacrylic acid, its ester, or a mixture thereof thereof as the main component (that is, in an amount of at least 50% by weight) and a copolymerizable ethylenically unsaturated monomer such as acrylic acid esters, styrene or α-methylstyrene. As the methacrylic acid ester, there can be mentioned methyl methacrylate, ethyl methacrylate, propyl methacrylate, butyl methacrylate, cyclohexyl methacrylate, 2-ethylhexyl methacrylate and benzyl methacrylate, and among these esters, methyl methacrylate is preferred. As the copolymerizable acrylic acid ester, there can be mentioned methyl acrylate, ethyl acrylate, butyl acrylate, cyclohexyl acrylate, 2-ethylhexyl acrylate and benzyl acrylate, and among these esters, methyl acrylate is preferred.

In the conventional process for the production of methacrylic polymers, a mercaptan chain transfer agent is generally used in combination with a radical polymerization initiator for adjusting the molecular weight of the polymer and improving the resistance of the polymer to thermal decomposition. But, as a result of research, it was found that a methacrylimide group-containing polymer obtained by imidizing a methacrylic polymer formed by polymerization in the presence of a mercaptan chain transfer agent is relatively readily colored under heating. If a shaped article of this methacrylimide group-containing polymer is exposed to a high-temperature atmosphere for a long time, yellowing occurs to mar the appearance of the product and drastically degrade the transparency. Accordingly, investigations were made with a view to improving the resistance to coloration under heating and it was found that, if a methacrylic polymer obtained by polymerization in the absence of a mercaptan chain transfer agent is imidized, a methacrylimide group-containing polymer having a highly improved resistance to coloration under heating can be obtained.

A radical polymerization initiator is generally used for polymerizing methacrylic acid, a methacrylic acid ester or a monomer mixture composed mainly of methacrylic acid and/or an ester thereof. The radical polymerization initiator is actively decomposed at a reaction temperature to generate radicals. As the initiator, there can be mentioned, for example, organic peroxides such as di-tert-butyl peroxide, dicumyl peroxide, methylethyl-ketone peroxide, di-tert-butyl perphthalate, di-tert-butyl perbenzoate, tert-butyl peracetate, 2,5-dimethyl-2,5-di(tert-butylperoxy)hexane, di-tert-amyl peroxide, benzoyl peroxide and lauryl peroxide, and azo compounds such as azobisisobutanol diacetate, 1,1'-azobiscyclohexanecarbonitrile, 2-phenylazo-2,4-dimethyl-4-methoxyvaleronitrile, 2-cyano-2-propylazoformamide and 2,2'-azobisisobutyronitrile.

These radical polymerization initiators can be used singly or in the form of a mixture of two or more thereof. The amount of the radical polymerization initiator used is determined according to the polymerization temperature and the desired molecular weight of the polymer.

When carrying out the present invention, it is especially preferable that the polymerization is conducted in the presence of an inert solvent. If an inert solvent is used, the molecular weight of the polymer can be easily adjusted and a high-purity polymer having a low impurity content can be advantageously obtained, and furthermore, it becomes possible to prepare a methacrylic polymer having an excellent transparency. As the inert solvent, there can be mentioned alcohols such as methanol, ethanol and propanol, aromatic hydrocarbons such as benzene, toluene and xylene, and ketones and ethers such as methyl ethyl ketone, glyme, dioxane and tetrahydrofuran. These solvents can be used singly or in the form of a mixture of two or more thereof. Preferably, the inert solvent is used in an amount of 10 to 60% by weight based on the sum of the inert solvent and methacrylic acid, a methacrylic acid ester or a mixture composed mainly of methacrylic acid or an ester thereof.

The molecular weight of the methacrylic polymer can be easily determined according to the amount of the radical polymerization initiator used and the polymerization temperature, and to the amount of the inert solvent when used. The polymerization temperature is generally 60° to 170° C.

A compound represented by the general formula $R-NH_2$ (sometimes referred to as "imidizing agent" hereinafter) is added to the obtained methacrylic polymer, and an imidation reaction is carried out according to customary procedures. R in the general formula stands for H, an alkyl group having 1 to 12 carbon atoms, a cycloalkyl group having 7 to 11 carbon atoms or an aryl group having 6 to 10 carbon atoms. These alkyl, cycloalkyl and aryl groups may be unsubstituted or may be substituted with a halogen atom, an alkoxy group, an acyl group or a carboxyl group.

As examples of the imidizing agent, there can be mentioned ammonia, amines such as methylamine, ethylamine, n-propylamine, n-butylamine, heptylamine, hexylamine, octylamine, nonylamine, decylamine, dodecylamine, hexadecylamine, octadecylamine, isobutylamine, sec-butylamine, tert-butylamine, isopropylamine, 2-ethylhexylamine, phenetylamine, benzylamine, p-chlorobenzylamine, and dimethoxyphenetylamine, and alanine, glycine, 3'-aminoacetophenone, 2-aminoanthraquinone, and p-aminobenzoic acid. As another examples, there can be mentioned cyclohexylamine, 2-amino-4,6-dimethylpyridine, 3-aminophthalimide, 2-aminopyridine, 2-aminothiazole, 5-amino-1-H-tetrazole, aniline, bromoaniline, dibromoaniline, tribromoaniline, chloroaniline, dichloroaniline, trichloroaniline, and p-toluidine. Among the above, ammonia and methylamine are preferred. Preferably, the imidizing agent is used in an amount of at least 20 mole% based on the monomer units of the polymer.

When carrying out the present invention, preferably the imidation reaction is conducted in the presence of a mixed solvent comprising methanol and an inert solvent having a solubility parameter $\delta$ of 8.5 to 13.9 $(cal/cm^3)^{\frac{1}{2}}$, because a methacrylamide group-containing polymer having an excellent transparency and optical characteristics is obtained.

The solubility parameter $\delta$ of the inert solvent, referred to herein, is based on the standard described in Polymer Handbook, Second Edition, J. Brandrup, E. H. Immergut, John Wiley and Sons, New York, 1975. Inert solvents other than methanol, can be used, and aromatic hydrocarbons such as benzene, toluene and xylene are preferred.

Where the imidation reaction is carried out in the presence of the above-mentioned mixed solvent, especially good effects can be obtained if the imidation reaction is conducted in an imidation reaction zone in which the reaction mixture is thoroughly stirred and blended. It is assumed that the solvent and imidizing agent are promptly diffused among polymer molecules and the imidation reaction is advanced uniformly and promptly.

Where the imidation reaction is carried out in the presence of the above-mentioned mixed solvent in a continuous manner, to uniformalize the residence time in the reaction zone and thereby uniformalize the imidation degree among polymer molecules, it is preferred that the reaction mixture is thoroughly stirred and blended, and the reaction zone is divided into at least two sections. For example, the reaction zone is divided into at least two sections by connecting at least two vessel type reactors equipped with a stirrer or circulating pump through a pipe or the like or by arranging partition plates in the longitudinal direction in the interior of a reactor, and a stirrer is disposed in each reaction section.

If the imidation reaction temperature is too high, coloration of the polymer occurs and the transparency is reduced. Accordingly, preferably the imidation reaction temperature is 150° to 300° C. Where the imidation reaction is carried out in the presence of the above-mentioned mixed solvent, from the viewpoints of the transparency and optical characteristics, most preferably the imidation reaction temperature is 180° to 250° C.

To obtain a metacrylimide group-containing polymer having especially excellent optical characteristics, preferably the polymerization of methacrylic acid, a methacrylic acid ester or a monomer mixture composed mainly of methacrylic acid or an ester thereof or both and the subsequent imidation reaction are continuously conducted. If this process is adopted, contact of the reaction mixture with oxygen in air can be avoided and coloration of the polymer can be controlled to a lowest level, and an incorporation of impurities such as dust can be prevented. Accordingly, a methacrylimide group-containing polymer having excellent optical characteristics, especially light-transmitting characteristics, can be prepared.

After termination of the imidation reaction, volatile components are separated from the reaction mixture to obtain a methacrylimide group-containing polymer. As the method of separating volatile components, there is usually adopted a method in which the reaction mixture is heated at 200° to 300° C. under a reduced pressure, and a screw extruder or a devolatizer is usually used. The final volatile component content in the polymer is adjusted to a level not higher than 1% by weight, preferably not higher than 0.5% by weight.

The methacrylimide group-containing polymer obtained according to the present invention has a high heat resistance and excellent light-transmitting characteristics, and therefore, if this polymer is used as a core material of a light-transmitting fiber, it is possible to obtain a heat-resistant light-transmitting fiber having excellent properties that cannot be obtained in the conventional optical fibers.

If a methacrylimide group-containing polymer obtained by carrying out the imidation reaction in the presence of a mixed solvent comprising methanol and an inert solvent having a solubility parameter δ of 8.5 to 13.9 $(cal/cm^3)^{\frac{1}{2}}$ or a methacrylimide group-containing polymer obtained under the above-mentioned specific conditions is used, an excellent heat-resistant light-transmitting fiber can be obtained. Furthermore, if the polymer obtained according to the present invention is used as a molding material, since the polymer has an excellent resistance to coloration under heating, little yellowing occurs even when the polymer is exposed to a high temperature atmosphere for a long time, and therefore, the polymer is an excellent transparent heat-resistant material.

According to the present invention, an excellent effect is obtained in that, by imidizing a methacrylic polymer prepared under a restricted condition, that is, in the absence of a mercaptan chain transfer agent, a methacrylimide group-containing polymer having an excellent resistance to coloration under heating can be obtained. By this feature, the transparency and light-transmitting performance at high temperatures are greatly improved and the industrial utilization value is remarkably increased. Especially, if the specific mixed solvent, specific reaction mode and specific reaction temperature, specified in the present specification, are used, the above-mentioned effects are further enhanced, and the effects are highest when the operations are conducted in a continuous manner.

The present invention will now be described in detail with reference to the following examples that by no means limit the scope of the invention. In the examples, all of "parts" and "%" are by weight.

In the examples, the physical properties of polymers were determined by the following methods.

(1) The intrinsic viscosity of the polymer was determined by measuring the flow time (ts) of a dimethylformamide solution having a sample polymer concentration of 0.5% by weight and the flow time (to) of dimethylformamide at 25°±0.1° C. by using a Deereax Bishoff viscometer, determining the relative viscosity ηrel from the ts/to value, and calculating the intrinsic viscosity according to the following formula:

intrinsic viscosity = $(\lim \eta_{rel}/C)_{c\to o}$ wherein C stands for grams of the polymer in 100 ml of the solvent.

(2) The heat distortion temperature was measured according to ASTM D-648.

(3) The yellowness index YI was measured according to JIS K-7103. Namely, a pellet of the obtained polymer was heated at 200° C. for 85 hours in air, forming a methylene chloride solution having a polymer concentration of 15% by weight and measuring the light transmission according to JIS K-7103 and expressing the light transmission in terms of the yellowness index YI.

EXAMPLE 1

An autoclave having an inner volume of 5 liters was charged with 4 l of a mixture comprising 98 parts of methyl methacrylate, 2 parts of methyl acrylate, 0.06 part of 2,2'-azobisisobutyronitrile and 0.08 part of 1,1'-azobis(1-cyclohexanecarbonitrile), and polymerization was carried at 90° C. with stirring in a nitrogen atmosphere. When the conversion reached about 50%, the polymerization liquid was taken out from the autoclave and re-precipitated by methanol. The polymer was vacuum-dried at 80° C. a whole day and night, and to 100 parts of the polymer were added 24 parts of monomethylamine, 160 parts of toluene and 40 parts of methanol, and a reaction was carried out at 230° C. for 4 hours in a nitrogen atmosphere in the above-mentioned autoclave. After termination of the reaction, the reaction liquid was taken out and a methacrylimide group-containing polymer was recovered in the same manner as described above. When the physical properties of the polymer were measured, the following results were obtained:

Intrinsic viscosity: 0.63
Heat distortion temperature: 146° C.
YI value: 13.2

COMPARATIVE EXAMPLE 1

A methacrylimide group-containing polymer was obtained in the same manner as described in Example 1 except that 0.16 part of tert-butylmercaptan was added in the polymerization stage. When the physical properties of the polymer were measured, the following results were obtained:

Intrinsic viscosity: 0.40
Heat distortion temperature: 145° C.
YI value: 73.1

EXAMPLE 2

The same autoclave as used in Example 1 was charged with 4 l of a mixture comprising 70 parts of methyl methacrylate, 0.15 part of di-tert-butyl peroxide and 30 parts of benzene, and polymerization was carried out at 140° C. in the same manner as described in Example 1. The polymer was re-precipitated and dried to obtain a methacrylic polymer, and to 100 parts of the polymer were added 23 parts of monomethylamine, 120 parts of toluene and 80 parts of methanol, and the imidation reaction was carried out in the same manner as described in Example 1. When the physical properties of the polymer were measured, the following results were obtained:

Intrinsic viscosity: 0.45
Heat distortion temperature: 145° C.
YI value: 10.8

EXAMPLE 3

Into a stirred polymerization vessel having an inner volume of 20 l, 60 parts of methyl methacrylate, 32 parts of toluene, 8 parts of methanol, 0.12 part of 2,2'-azobisisobutyronitrile and 0.1 part of 1,1'-azobis(1-cyclohexanecarbonitrile) were continuously supplied at a rate of 4 l/hr, and polymerization was carried out at a temperature of 110° C. The polymerization liquid was continuously withdrawn, a 15% solution of monomethylamine in a toluene/methanol (7/3) mixed solvent was added at a rate of 4.5 l/hr to the polymerization liquid, and the mixture was supplied to a stirred reaction vessel having an inner volume of 28 l. This reaction vessel was divided in the longitudinal direction by 9 partition plates and stirring vanes were arranged in respective reaction sections to thoroughly stir the reaction liquid in the reaction zone. The reaction temperature was maintained at 215° C., and nitrogen was sealed into the reaction vessel to elevate the pressure to 65 kg/cm². The reaction liquid withdrawn from the vessel was supplied to a double-vented extruder having a screw diameter of 30 mm in which the vacuum degree of the vent portion was 5 mmHg, the temperature of the vent portion was 250° C., the temperature of the metering portion was 270° C., the temperature of the die portion was 260° C., whereby volatile components were removed. The polymer liquid was introduced into a spinning nozzle connected directly to the extruder to extrude the polymer in the form of a fiber having an outer diameter of about 1 mm. The physical properties of the fibrous polymer were as shown below:
Intrinsic viscosity: 0.49
Heat distortion temperature: 148° C.

The obtained methacrylimide group-containing fibrous polymer was maintained in an air atmosphere at 135° C. for 1,000 hours, and the polymer was cooled to room temperature and coated with an ethyl acetate solution containing 35% by weight of a 2,2,2-trifluoroethyl methacrylate polymer (*weight average molecular weight* $= 8 \times 10^4$) through a dipping pot, to obtain a light-transmitting element. Separately, the methacrylimide group-containing fibrous polymer just after the preparation was similarly coated to obtain a light-transmitting element. The increase of the attenuation at 650 nm after standing at 135° C. for 1,000 hours, obtained by measuring the transmission performances of these two light transmitting elements, was as shown below:
Increase of attenuation after standing at 135° C. for 1,000 hours: 120 dB/km

COMPARATIVE EXAMPLE 2

A fibrous polymer was prepared by carrying out polymerization, imidation and spinning in the same manner as described in Example 3 by using 70 parts of methyl methacrylate, 24 parts of toluene, 6 parts of methanol, 0.02 part of 2,2,-azobisisobutyronitrile, 0.1 part of 1,1'-azobis(1-cyclohexanecarbonitrile) and 0.13 part of n-octylmercaptan. When the physical properties of the fibrous polymer were measured, it was found that the intrinsic viscosity was 0.48 and the heat distortion temperature was 149° C. When the increase of the attenuation after standing at 135° C. for 1,000 hours was measured in the same manner as described in Example 3, the following result was obtained.
Increase of attenuation after standing at 135° C. for 1,000 hours: 670 dB/km As apparent from the results obtained in Example 3 and Comparative Example 2, a methacrylimide group-containing polymer derived from a methacrylic polymer obtained by conducting polymerization in the absence of a mercaptan chain transfer agent is characterized as exhibiting an excellent light-transmitting property at a high temperature.

EXAMPLE 4

A methacrylimide group-containing fibrous polymer was prepared in the same manner as described in Example 3 except that the content of monomethylamine in the mixed solvent was changed to 17% and the mixing ratio in the toluene/methanol mixed solvent was changed to 8/2, and the imidation reaction was carried out at 225° C. The intrinsic viscosity of this polymer was 0.43 and the heat distortion temperature was 154° C. In this fiber, the attenuation after standing at 145° C. for 1,000 hours was 130 dB/km.

We claim:

1. A light-transmitting fiber comprising a polymer as a core component and a polymer having a refractive index smaller than that of the core component as a sheath component, wherein the core component is a methacrylimide group-containing polymer prepared by a process comprising polymerizing methacrylic acid, a methacrylic acid ester, or a monomer mixture predominantly comprised of methacrylic acid or an ester thereof in the absence of a chain transfer agent and then reaction the thus-prepared polymer with a compound represented by the following general formula:

$$R-NH_2$$

wherein R stands for H, an alkyl group having 1 to 12 carbon atoms, a cycloalkyl group having 7 to 11 carbon atoms or an aryl group having 6 to 10 carbon atoms, in the presence of a mixed solvent comprising methanol and a solvent having a solubility parameter $\delta$ of 8.5 to 13.9 $(cal/cm^3)^{\frac{1}{2}}$.

2. The light-transmitting fiber according to claim 1, wherein methacrylic acid, a methacrylic acid ester or the monomer mixture is polymerized in the presence of 10 to 60% by weight of an inert solvent, based on the total weight of the inert solvent and the methacrylic acid, methacrylic acid ester or the monomer mixture.

3. The light-transmitting fiber according to claim 1, wherein the solvent having a solubility parameter $\delta$ of 8.5 to 13.9 $(cal/cm^3)^{\frac{1}{2}}$ is an aromatic hydrocarbon.

4. The light-transmitting fiber according to claim 1, wherein the imidation reaction is carried out in an imidation reaction zone where the reaction mixture is thoroughly stirred.

5. The light-transmitting fiber according to claim 4, wherein the imidation reaction is carried out in a continuous manner and in an imidation reaction zone having at least two divided sections.

6. The light-transmitting fiber according to claim 1, wherein the imidation reaction is carried out at a temperature of 180° to 250° C.

7. The light-transmitting fiber according to claim 1, wherein the polymerization of methacrylic acid or the ester thereof or the monomer mixture and the imidation reaction of the obtained polymer are carried out in a continuous manner.

* * * * *